J. Tagliabue.
Coal Oil Tester.
Nº 36,488.      Patented Sept. 16, 1862.
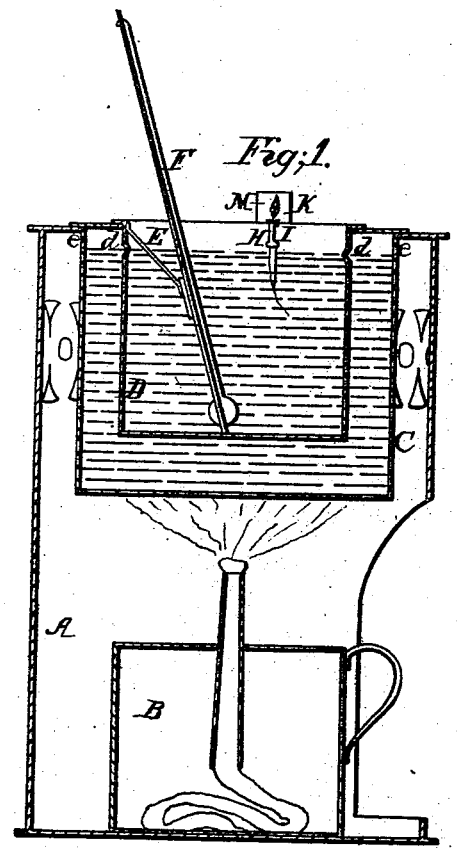
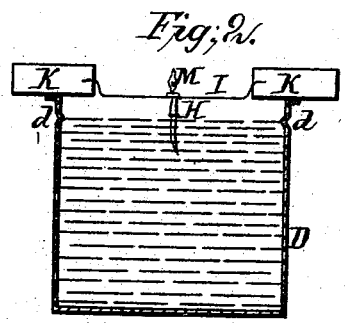
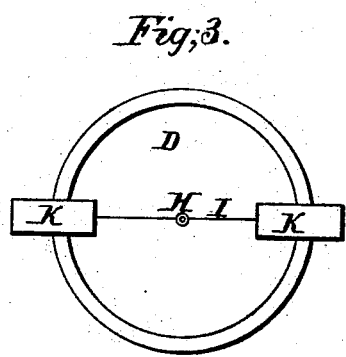
Witnesses:
Inventor:
John Tagliabue

UNITED STATES PATENT OFFICE.

JOHN TAGLIABUE, OF NEW YORK, N. Y.

IMPROVED APPARATUS FOR TESTING COAL-OIL.

Specification forming part of Letters Patent No. 36,488, dated September 16, 1862.

*To all whom it may concern:*

Be it known that I, JOHN TAGLIABUE, of New York, in the county and State of New York, have invented a new and Improved Apparatus for Testing the Explosiveness of Coal-Oils or Petroleum, which I believe to overcome the objections which pertain to all the apparatus heretofore in use for that purpose, and to furnish a uniform and reliable test of the temperature to which such liquids may be exposed before evolving an explosive vapor.

The following specification, taken in connection with the accompanying drawings, making part of the same, I hereby declare to be a sufficiently full and exact description of my said invention to enable others skilled in the art to make and use the same.

A want of even approximate uniformity in the results obtained has attended the use of the forms of apparatus heretofore employed, resulting from a want of perfect uniformity in the conditions and from defects in the apparatus used. This uncertainty is of so serious a character that in several experiments made upon the same sample of oil the results vary sometimes as much as sixty degrees.

To produce reliable tests it is necessary that the oil should be heated uniformly, in order that the thermometer may indicate the true temperature at which the explosive vapor is evolved, that the least possible quantity of heat should be transmitted to the surface of the oil from the testing-flame, and that the size and height of this flame from the surface of the oil should remain as nearly as possible at a given standard. By the construction of my apparatus I believe these conditions are readily fulfilled and uniform results obtained with ordinary care in conducting the experiments.

In the drawings, Figure 1 is a vertical section of the apparatus; and Figs. 2 and 3 are views of the burner.

A is a case, and B an alcohol-lamp made in an ordinary form for the convenient application of heat to oil to be tested.

C is a metallic vessel supported within A, above the flame of the lamp B. Holes c c are made in C, near the top, to allow the surplus water to flow out, thus securing a certain and uniform level of the water in C, which serves as a water-bath for the even transmission of heat from the lamp B to the oil to be tested.

D is another vessel supported within C, and at a distance from the sides and bottom thereof. A rib or groove, d, is formed in D at such a point that when supported in C this rib or groove will come just opposite the bottom of the holes c. A support, E, extending from near the top of D, sustains a thermometer, F, as represented.

The burner is made as follows: A short glass tube, H, about the one thirty-secondth part of an inch in diameter, is fitted with a slight head at each end, and a fine wire, I, coiled around it, as represented. This wire is shorter than the diameter of D, and its ends are secured in two pieces of cork, K, or other suitable non-conducting substance. The adjustment is such that only the head on the upper end of H projects above the plane of the upper end of D, which adjustment is so simple that a slight inspection will at any time determine its accuracy, and a bending of the wire I will suffice to readjust it in case it becomes deranged. A wick of cotton or other proper fiber is fitted in H to reach down into the oil in D.

The mode of testing oils by this apparatus is as follows: The vessel D is filled up to the ridge d with the oil which it is desired to test. The vessel C is filled nearly full of water, and D placed therein, which causes a portion of the water to overflow through the holes c, thus bringing the oil and water at the same level, as represented. The thermometer F is placed in position and the burner H I K laid upon D, so as to bring H near the center thereof. The wick in H is now lighted and the wick drawn down until the flame M is at its minimum size. Coal-oil possesses the peculiar property of causing the flame to increase in size as it burns under ordinary conditions; but with my improved burner, when the flame is thus adjusted, it remains constant. Heat is now applied through the lamp B to the water in C, which transmits it to the oil in D in a very even and gradual manner in consequence of the water entirely surrounding the oil, which latter is insured by the construction of the water-bath. As oil is a poor conductor of caloric, it is essential that it be heated as uniformly as possible, and to secure that end it should be heated slowly; as the temperature rises and approaches the point at which it is supposed the explosive vapor will be generated, the lamp B should be removed to allow of the gradual imparting to the oil of the excess of heat which always obtains in the water. Should this not be sufficient the lamp must be replaced for a moment and again removed, until it is found that an explosive vapor is generated. This is known by such vapor being exploded by the flame M, and the temperature indicated at this instant by the thermometer is that at which that sample of oil becomes dangerous.

I am aware that several forms of apparatus and modes of testing this quality of coal-oils and petroleum have been suggested and used to some extent; but I believe my improved apparatus to possess the following advantages over all others heretofore proposed for that purpose: First, uniform heating of the oil from the uniformity of the height of the water in the water-bath, as compared to that of the oil; second, uniformity in the size of the flame M, arising from the employment of the glass capillary tube H, in the manner described; third, minimum amount of disturbance from the heat of the flame M, due to the employment of the glass wick-tube H and the non-conducting supports K.

Possessing these advantages, my apparatus is capable, with ordinary care, of producing more reliable results than any with which I am acquainted.

Having now fully described my invention, what I claim as new therein, and desire to secure by Letters Patent, is—

1. The employment of the holes $c\ c$ in the bath C, in connection with the mark $d$, for adjusting the height of the oil in D, for the purpose set forth.

2. The employment of the glass capillary wick-tube H, for the purpose above specified.

3. Supporting the wick-tube H by means of a poor conductor for the purpose of preventing the transmission of heat from the flame M to the oil in D, substantially as herein described.

JOHN TAGLIABUE.

Witnesses:
  CHAS. W. SMITH,
  I. D. SNYDER.